3,563,689
PROCESS USEFUL TO PRODUCE A FABRIC THAT EXHIBITS IMPROVED FIRE RETARDANT PROPERTIES UTILIZING HALOGENATED OXIRANE AND THIIRANE REACTANTS
Truman L. Ward and Ruth R. Benerito, New Orleans, La., assignors to the United States of America as represented by the Secretary of Agriculture
No Drawing. Filed May 1, 1969, Ser. No. 821,118
Int. Cl. D06m 13/08, 13/28, 13/40
U.S. Cl. 8—116.2
4 Claims

ABSTRACT OF THE DISCLOSURE

A process for increasing the flame resistance of cellulose by adding halogens thereto which comprises treating diethylaminoethyl cellulose with a halogenated oxirane in the presence of thiourea or with a halogenated thiirane in the presence of an alcohol.

---

A non-exclusive, irrevocable, royalty-free license in the invention herein described, throughout the world for all purposes of the United States Government, with the power to grant sublicenses for such purposes, is hereby granted to the Government of the United States of America.

An object of this invention is to prepare a flame resistant cellulosic fabric. Halogens are known from prior art to impart fire retardant properties to cellulosic fabrics. This invention describes methods whereby halogens can be added to diethylaminoethylated (DEAE) cotton to enhance its fire resistant properties.

Halogenated compounds are well known in the art to exhibit flame retardancy properties [Le Blanc, R. B., American Dyestuff Reporter, 57, No. 27, 35 (1968)]. Yeadon (Yeadon, D. A., Rayner, E. T., Verburg, G. B., Dollear, F. G., Hooper, L. L., and Dupuy, H. P., U.S. Pat. No. 3,396,129, Aug. 6, 1968) used halogenated compounds for increasing flame retardancy properties of coating compositions. By the process of this invention, halogens can be added to diethylaminoethylated cellulose by reacting it with a mixture consisting of one part of thiourea and 9 parts of a trihalogenated epoxy-propane or by reacting the DEAE cellulose with a halogenated derivative of propylene sulfide in a suitable alcohol.

In the reaction involving DEAE cellulose and a mixture consisting of one part of thiourea and 9 parts of a trihalogenated compound, good results are obtained only by the preferred process of this invention. Monohalogenated compounds give poor results. Unmodified cellulose adds only a negligible amount of halogens. The use of a base, such as sodium hydroxide, in place of thiourea does not yield comparable results showing the thiourea to function in a different capacity than solely as a base.

In the preferred process, DEAE cellulose is treated at 50° C.±15° C. in a mixture of nine parts of trihalogenated propylene oxide to one part of thiourea for a period of one hour. At the end of the alloted reaction time, the fabric is removed from the reaction chamber and washed well with water. The fabric may be dried by any method customarily used.

1,1,1-trichloro 2,3-epoxypropane or 1,1,1-tribromo-2,3-epoxypropane are suitable halogenating agents and a temperature of 50° C. for one hour suitable reaction conditions. Temperatures substantially higher or lower than 50° C. are unsuitable as the reaction either ceases, if the temperature is too low, or the reaction is difficult to control if the temperature is too high.

In the reaction involving DEAE cellulose and a halogen derivative of propylene sulfide good results are obtained only by the preferred process of this invention. No addition of halogen occurs when the halogen derivatives of propylene oxide is reacted with cotton. There is no addition in the absence of a catalyst, or with the usual acid catalyst. Use of a basic catalyst adds oxygen but does not add chlorine. One would expect that the sulfur analogue would act in a similar manner to the propylene oxide compound so the addition of halogen to cellulose by use of the halogenated propylene sulfide would not be anticipated from prior art.

According to this invention, DEAE cellulose is treated by refluxing in a solution of the halogenated propylene sulfide in a suitable alcohol. The reaction mixture is adjusted to a pH of 8 to cause a maximum of abnormal ring opening which then adds the halogen. These conditions minimize normal ring opening which occurs in very basic solutions and which result in loss of halogen through dihydrohalogenation.

In the preferred process the DEAE cellulose is suspended in a ten percent solution of 1-chloro-2,3-epithiopropane in tertiary pentyl alcohol and reacted at reflux temperature for 4 or more hours. A different episulfide such as 1-bromo-2,3-epithiopropane may be used and a different alcohol such as octyl alcohol may be used as solvent. Hindered alcohols, such as tertiary pentyl, or long chain normal alcohols, such as normal octyl, are preferred over alcohols with a smaller number of carbon atoms.

At the end of the alloted reaction time, the cellulosic material is removed from the reflux chamber and washed well with water. The fabric may be dried by any method customarily used.

The following examples illustrate but do not limit the scope of the invention.

EXAMPLE 1

A 12 x 12 inch square of DEAE cotton fabric of .85% N weighing approximately 10 g. was refluxed for 4 hours in 100 ml. of a solution of 10% 1-chloro-2,3-epithiopropane in octyl alcohol with the pH of solution preset to 8.0. Upon completion of reaction the sample was washed, dried, and air equilibrated before analysis. The fabric analyzed 1.14% chlorine and 0.58% sulfur.

EXAMPLE 2

Example 1 except that tertiary pentyl alcohol was used rather than octyl alcohol. The fabric sample analyzed 1.23% chlorine and 0.64% sulfur.

EXAMPLE 3

Example 2 except that 8 hours reaction time was used rather than 4 hours. The fabric analyzed 1.79% chlorine and 0.89% sulfur.

EXAMPLE 4

Example 1 except that 1-Br-2,3-epithiopropane is used rather than the chloro compound. The addition of halogen is equivalent to that of Example 1.

EXAMPLE 5

Example 2 except that 1-Br-2,3-epithiopropane is used rather than the chloro compound. The addition of halogen is equivalent to that of Example 2.

EXAMPLE 6

Example 3 except that 1-Br-2,3-epithiopropane is used rather than the chloro compound. The addition of halogen is equivalent to that of Example 3.

EXAMPLE 7

Unmodified cotton treated under the conditions of Example 1 added 1.55% sulfur but only 0.07% chlorine. DEAE cellulose treated as in Example 1 but under basic conditions added 3.84% sulfur and only 0.48% chlorine.

EXAMPLE 8

A 12 x 12 inch square of DEAE cotton fabric weighing approximately 10 grams was treated for 1 hour at 50° C. in a mixture of nine parts of 1,1,1-trichloro 2,3-epoxypropane and one part thiourea. At the end of reaction the fabric was removed from the reaction flask and thoroughly washed with distilled water, dried, and air equilibrated before analysis. The sample analyzed 10.61% chlorine, and 1.27% sulfur. The sample passes a flame resistance angular screening test at 180°.

EXAMPLE 9

12 x 12 inch square of DEAE cotton fabric weighing approximately 10 g. is treated as in Example 1 except that 1,1,1-tribromo 2,3-epoxypropane is used rather than the trichloro compound. The results are equivalent to those of Example 1.

We claim:
1. A process for producing cellulosic fabrics which exhibit improved fire retardant properties comprising:
    (a) reacting a diethylaminoethylated cellulose in fabric form with a mixture consisting of one part of thiourea and nine parts of a halogenated compound selected from a group consisting of 1,1,1-trichloro 2,3-epoxypropane and 1,1,1-tribromo 2,3-epoxypropane for a period of about one hour at a temperature of about 50° C. and
    (b) washing the fabric free of excess reagents.
2. The product produced by the process of claim 1.
3. A process for producing cellulosic fabrics which exhibit improved fire retardant properties comprising:
    (a) refluxing a diethylaminoethylated cellulose in fabric form with 1-bromo-2,3-epithiopropane dissolved in an alcohol selected from a group consisting of n-octyl alcohol and t-pentyl alcohol for a period of about 4 to 8 hours and
    (b) washing the fabric free of excess reagents.
4. The product produced by the process of claim 3.

References Cited

Soignet et al., Journal of Applied Polymer Science, vol. 11, pp. 1155—1172 (1967).

GEORGE F. LESMES, Primary Examiner

J. CANNON, Assistant Examiner

U.S. Cl. X.R.

8—120; 117—137